H. SCHEDLER.
ETCHING MACHINE.
APPLICATION FILED SEPT. 28, 1908.
940,480.
Patented Nov. 16, 1909.
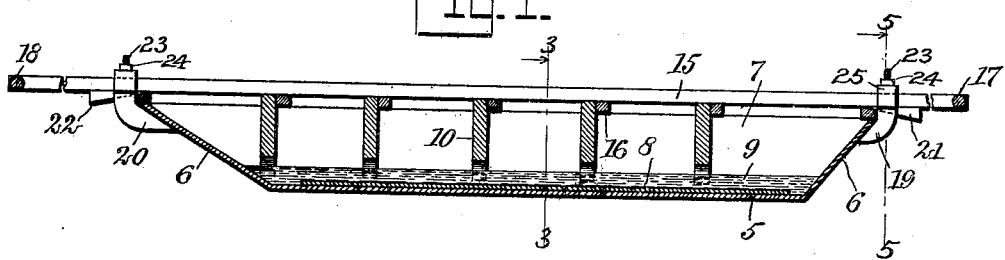
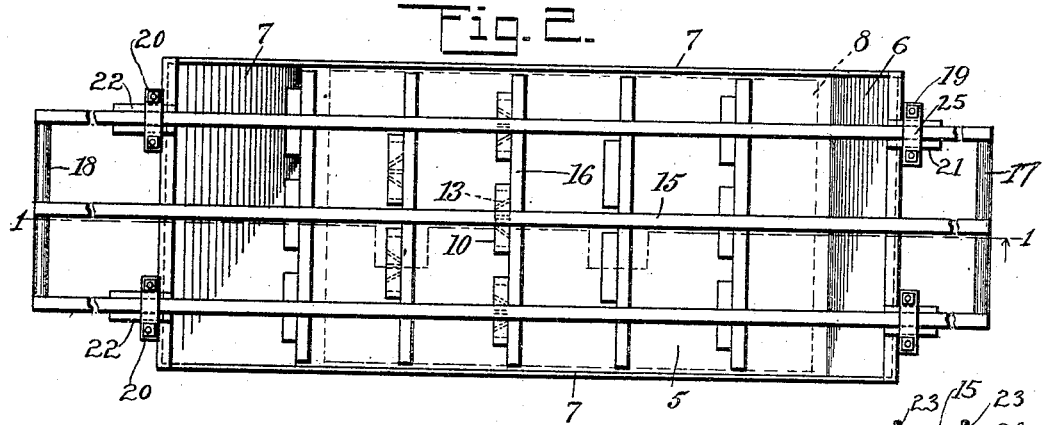
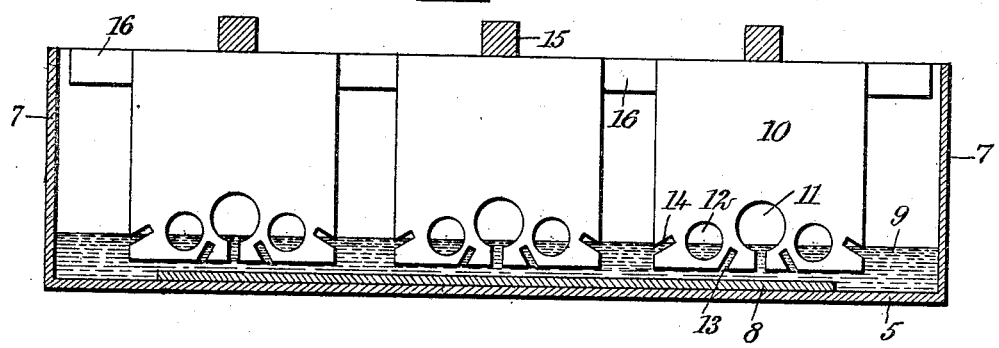
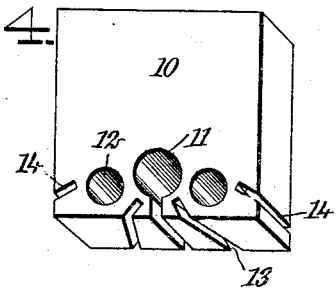
WITNESSES
INVENTOR
Herman Schedler
BY
ATTORNEYS

UNITED STATES PATENT OFFICE.

HERMANN SCHEDLER, OF NEW YORK, N. Y.

ETCHING-MACHINE.

940,480. Specification of Letters Patent. Patented Nov. 16, 1909.

Application filed September 28, 1908. Serial No. 455,056.

*To all whom it may concern:*

Be it known that I, HERMANN SCHEDLER, a citizen of the United States, and a resident of the city of New York, borough of Manhattan, in the county and State of New York, have invented a new and Improved Etching-Machine, of which the following is a full, clear, and exact description.

My invention relates to etching machines of the type in which a plate or other article to be etched is exposed to the action of free acid in a trough.

The particular purposes of my improvement are as follows: 1. To facilitate the free circulation of the acid relatively to the article to be etched, and to cause the commingling of air with the acid in order to facilitate the action of the acid. 2. To cause thorough etching of the plate without the use of brushes making actual contact therewith. 3. To employ paddles or agitators made in peculiar form in order to facilitate the two objects above stated. 4. To enable the operator to readily adjust the depth to which the agitators or paddles dip into the acid.

Reference is to be had to the accompanying drawings forming a part of this specification, in which similar characters of reference indicate corresponding parts in all the figures.

Figure 1 is a vertical section upon the line 1—1 in Fig. 2, looking in the direction of the arrow, and showing the trough, a plate resting in the bottom thereof, free acid covering the plate, and my improved paddles dipping into this acid, the view further showing how the immersion of the paddles is controllable at will, and also how the paddles are actuated; Fig. 2 is a plan view of the complete apparatus shown in Fig. 1; Fig. 3 is an enlarged cross section upon the line 3—3 in Fig. 1, looking in the direction of the arrow, and showing how the paddles are mounted upon the movable frame; Fig. 4 is a detail showing in perspective one of the paddles, and Fig. 5 is a detail sectional view on the line 5—5 in Fig. 1, showing how the adjusting wedges are fitted in position and how they are used in order to regulate the depth of the paddles in the acid.

A trough is shown at 5 and is provided with sloping ends 6 and with side walls 7. A plate 8 to be etched is rested on the bottom of the trough and covered with a quantity of free acid 9. The paddles are shown at 10 and may be made of wood, hard rubber or other acid-proof material. Each paddle is provided with openings 11, 12 of different sizes, extending entirely through it, and is further provided with slots 13, 14 extending in different directions and cut into the edges of the paddles at different points, the slots 13 being cut into the bottom and the slots 14 being cut into the sides of the paddles. A number of longitudinal bars 15 extend lengthwise of the trough, and disposed across these bars and connected rigidly with the under side thereof are cross bars 16, the longitudinal bars 15 and cross bars 16 being rigid in relation to each other, and together constituting a movable frame.

The paddles 10 are secured firmly upon this frame and are movable with it. Handles 17, 18 are provided for the frame in order to enable it to be moved relatively to the trough. Mounted at opposite ends of the trough 5 are lugs 19, 20, and engaging the latter are wedges 21, 22. Bolts 23 extend upwardly from the lugs 19 and 20, and revolubly fitted upon these bolts are nuts 24. Straps 25 are held down by the nuts 24, in such manner as to clamp the wedges 21 and 22, and yet allow the longitudinal bars 15 to move endwise within proper limits.

The operation of my device is as follows: The parts being assembled as above described, and the plate 8 being in the bottom of the trough and covered by the acid 9, the operator adjusts the wedges 21, 22 so as to give the paddles 10 a desired degree of immersion in the acid 9. The operator next grasps either handle 17 or 18 and slides the frame longitudinally in the general direction of the length of the trough. In doing this, the acid 9 is forced through the various openings 11, 12 and slots 13, 14, and thereby caused to flow in divers directions. Moreover, this action causes more or less air to become commingled with the acid, and this air is thus brought into minute contact with the plate 8 to be etched. The current of the etching fluid, created by so being forced through the opening, draws with it any sediment deposited at the bottom and along the lines being etched, which otherwise would act as a protection against such parts being etched deeper.

I have made the discovery that if acid be brought into minute contact with air, as, for instance, by spraying the air into the acid, a large amount of air is absorbed by the acid, and this air appears to intensify the effect of the acid, thereby promoting economy in the use of the acid as well as causing the acid to do better work in the matter of etching. I have also made the discovery that by arranging the paddles 10 so that the slots 13 of one paddle extend in different directions relatively to the slots 13 of another paddle, as indicated in dotted lines in Fig. 2, the general effect of the acid is greatly improved. This is simply because the air is brought into better contact with the acid, and the acid holding the air by absorption is in turn brought into better contact with the article to be etched. I have also discovered that by making the openings 11, 12 of different sizes the stirring of the acid is rendered much more effective—owing, I suppose, to the fact that the acid can pass through a large opening more readily than through a smaller one, and consequently, as the paddles 10 are moved through the liquid, eddies are formed which have an important effect in stirring the acid.

If the acid becomes weak, because of prolonged use, it is sometimes desirable to lower the paddles so as to bring them into closer proximity with the article to be etched. The operator thereupon loosens the nuts 24, adjusts the wedges 21, 22 by drawing them slightly outward from the ends of the trough, and tightens the nuts 24. The frame may now be slid longitudinally in the general direction of the trough, as before, the only difference being that the bottoms of the paddles are closer to the plate to be etched. This being done, the agitation of the acid relatively to the plate is somewhat increased. By thus adjusting the frame carrying the paddles, the work of the acid may be rendered more thoroughly uniform, so that the time taken to etch the plate with old acid need not vary from that required for etching a plate with new acid. The quality of the etching is also greatly improved.

I am aware that in etching apparatus of the kind heretofore employed, brushes dipping into an acid have been employed. The purpose of these brushes, however, has been to engage directly the surface to be etched, and their use has necessarily been attended with more or less impairment in the quality of the work done. What I seek to do is to cause the acid to produce a maximum effect and yet to prevent the actual contact of the paddles with the surface to be etched.

Having thus described my invention, I claim as new and desire to secure by Letters Patent:

1. An etching machine, comprising a paddle provided with holes extending through it, and further provided with slots, said slots forming angles with each other, a frame connected with said paddles for the purpose of actuating the same, and a trough partially inclosing said paddles and adapted to hold an acid.

2. In an etching machine, the combination of a trough provided with lugs, wedges engaging said lugs and movable relatively to the same, a frame resting upon said wedges and movable relatively to said trough, and paddles connected with said frame and depending into said trough for the purpose of agitating an acid therein.

3. In an etching machine, the combination of a trough, a frame movable relatively to the same, and a paddle mounted upon said frame, said paddle being provided with mutilations of different sizes extending through it.

4. A device of the character described, comprising a trough, a frame movable relatively to the same, and a paddle carried by said frame and extending into said trough, said paddle being provided with mutilations extending entirely through it, the said mutilations being of different sizes, some of said mutilations forming angles relatively to others of said mutilations for the purpose of facilitating the circulation of liquid through said paddle.

In testimony whereof I have signed my name to this specification in the presence of two subscribing witnesses.

HERMANN SCHEDLER.

Witnesses:
   WALTON HARRISON,
   JOHN P. DAVIS.